(12) United States Patent
Nystrom

(10) Patent No.: US 6,390,866 B1
(45) Date of Patent: May 21, 2002

(54) HYDRAULIC CYLINDER WITH ANTI-ROTATION MOUNTING FOR PISTON ROD

(75) Inventor: Frederic E. Nystrom, Racine, WI (US)

(73) Assignee: Twin Disc, Incorporated, Racine, WI (US)

( * ) Notice: Subject to any disclaimer, the term of this patent is extended or adjusted under 35 U.S.C. 154(b) by 0 days.

(21) Appl. No.: 09/775,240

(22) Filed: Feb. 1, 2001

(51) Int. Cl.[7] ................................................ B63H 5/125
(52) U.S. Cl. .......................................... 440/57; 440/61
(58) Field of Search ............................ 440/53, 42, 57, 440/61, 49, 63, 38; 114/114 R

(56) References Cited

U.S. PATENT DOCUMENTS

| | | | |
|---|---|---|---|
| 4,726,284 A | 2/1988 | Green ........................ | 92/128 |
| 4,736,675 A | 4/1988 | Stoll ............................. | 92/13 |
| 4,838,146 A | 6/1989 | Stoll ............................. | 92/5 |
| 5,246,392 A | * 9/1993 | Johnston ..................... | 440/42 |
| 5,750,952 A | 5/1998 | Johnson ...................... | 219/89 |
| 5,761,985 A | 6/1998 | Stoll ............................ | 92/165 |

\* cited by examiner

*Primary Examiner*—Stephen Avila
(74) *Attorney, Agent, or Firm*—Nilles & Nilles SC

(57) ABSTRACT

A double-acting hydraulic cylinder and piston rod unit having fluid hoses for conducting fluid thereto. A generally flat outer end is provided on the piston or cylinder. A bracket has a spherical socket and either the piston rod end or cylinder has a spherical ball portion swively mounted in the socket. A yoke has a slot in which the generally flat end is slidably mounted for sliding in opposite directions. The flat end prevents relative rotation between the rod and cylinder about a longitudinal axis. Guide slots are provided and arranged at right angles to the yoke slot, the yoke being slidable in the guide slots whereby the unit can swivel about the socket and can slide in the opposite directions in the yoke and the unit can also move at right angles thereto by sliding with the yoke in the guide slots. The piston rod and cylinder are prevented from rotating relative to one another about their longitudinal axis and thereby prevent twisting of the hoses.

12 Claims, 6 Drawing Sheets

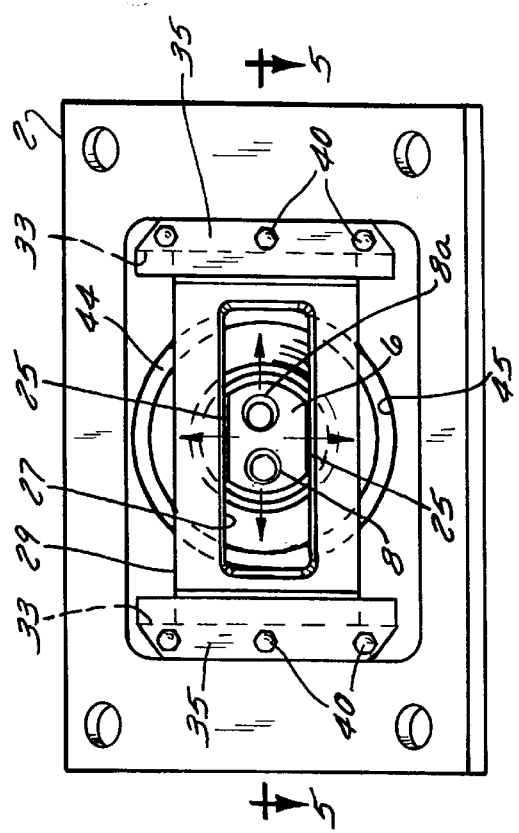
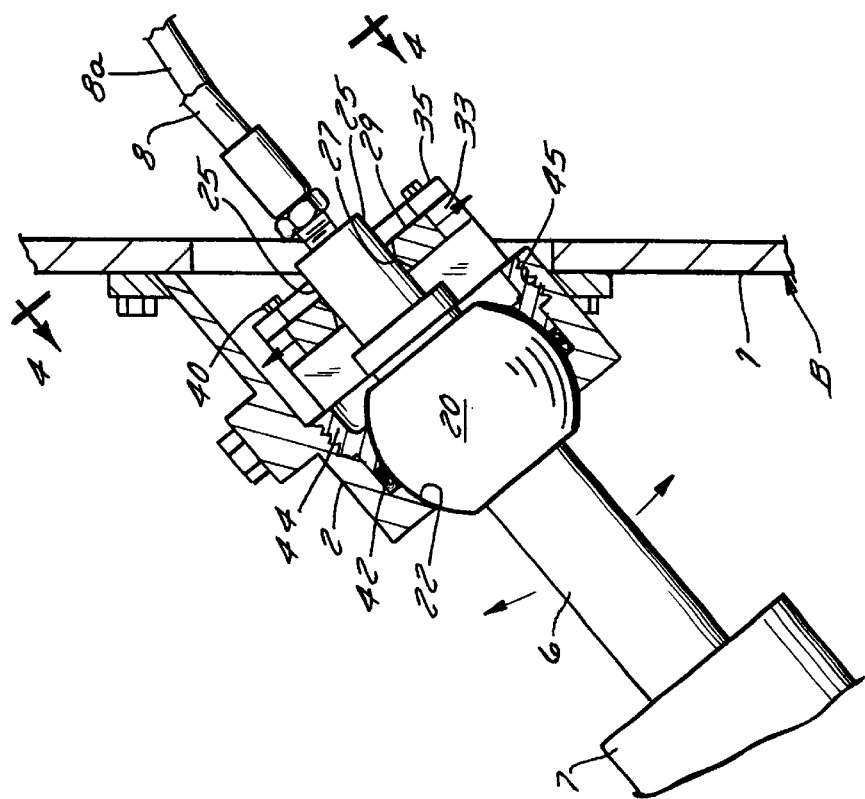
FIG. 4
FIG. 3

HYDRAULIC CYLINDER WITH ANTI-ROTATION MOUNTING FOR PISTON ROD

BACKGROUND OF THE INVENTION

1. Field of the Invention

The invention relates to a hydraulic cylinder and piston having means for preventing rotation of the piston rod within the cylinder, or for preventing rotation of the cylinder about its longitudinal axis relative to the piston rod.

2. Description of the Prior Art

The following U.S. patents have as a general object the prevention of the piston rod from rotating. U.S. Pat. No. 4,736,675, issued Apr. 12, 1988, utilizes a guide rod that extends from a bracket externally attached to the piston rod. U.S. Pat. No. 4,838,146, issued Jun. 13, 1989, uses a complex and fragile device for preventing rotation of the piston rod, the device being externally mounted along the cylinder. U.S. Pat. No. 5,750,952, issued May 12, 1998, uses an internal, off-centered rod parallel to the piston rod to prevent rotation of the piston and piston rod relative to the cylinder. U.S. Pat. No. 4,726,284, issued Feb. 23, 1988, uses a special cylinder that is single acting, one end of the piston defines a slot for receiving the end of the rod having an enlarged cross section. U.S. Pat. No. 5,761,985, issued Jun. 9, 1998, utilizes a square piston rod and has additional complications that would make it difficult to seal the rod and would increase manufacturing cost and maintenance.

SUMMARY OF THE INVENTION

The present invention provides a hydraulic cylinder and piston rod unit which finds particular utility for adjusting a surface-piercing marine outdrive. More particularly, the invention provides a double-acting hydraulic cylinder and a piston rod unit in which the cylinder and rod are constrained from relative rotation about their axis. The invention provides a flattened or noncircular in-section end on the unit that is engaged in a slotted member, which in turn is slidably mounted on a housing. The invention prevents relative rotation between the piston rod and cylinder to prevent the attached hoses from becoming twisted and eventually failing. This failure would cause oil spillage and prevent operation of the cylinder and piston rod unit.

More specifically, the unit is able to swivel but is prevented from rotation around its own axis and finds particular utility as a double-acting unit for use in adjusting the surface drive of a marine propeller. The connection between the end of the unit and the boat is waterproof, that is, it is shielded or sealed from the water. The invention can be applied at either end of the cylinder-piston rod unit, depending on which end is attached to the vessel.

The invention is low cost to manufacture and assemble, provides ease of service, and is of robust construction. The parts can be machined with liberal machining tolerances.

BRIEF DESCRIPTION OF THE DRAWINGS

FIG. 1 is a perspective view of a marine outboard drive apparatus showing the present invention both as a trim cylinder 7 and a steering cylinder 7a;

FIG. 3 is a fragmentary view in section of a portion of FIG. 2 and showing certain parts being broken away for the sake of clarity;

FIG. 4 is a view taken along line 4—4 in FIG. 3;

BRIEF DESCRIPTION OF THE PREFERRED EMBODIMENT

Figure 1:
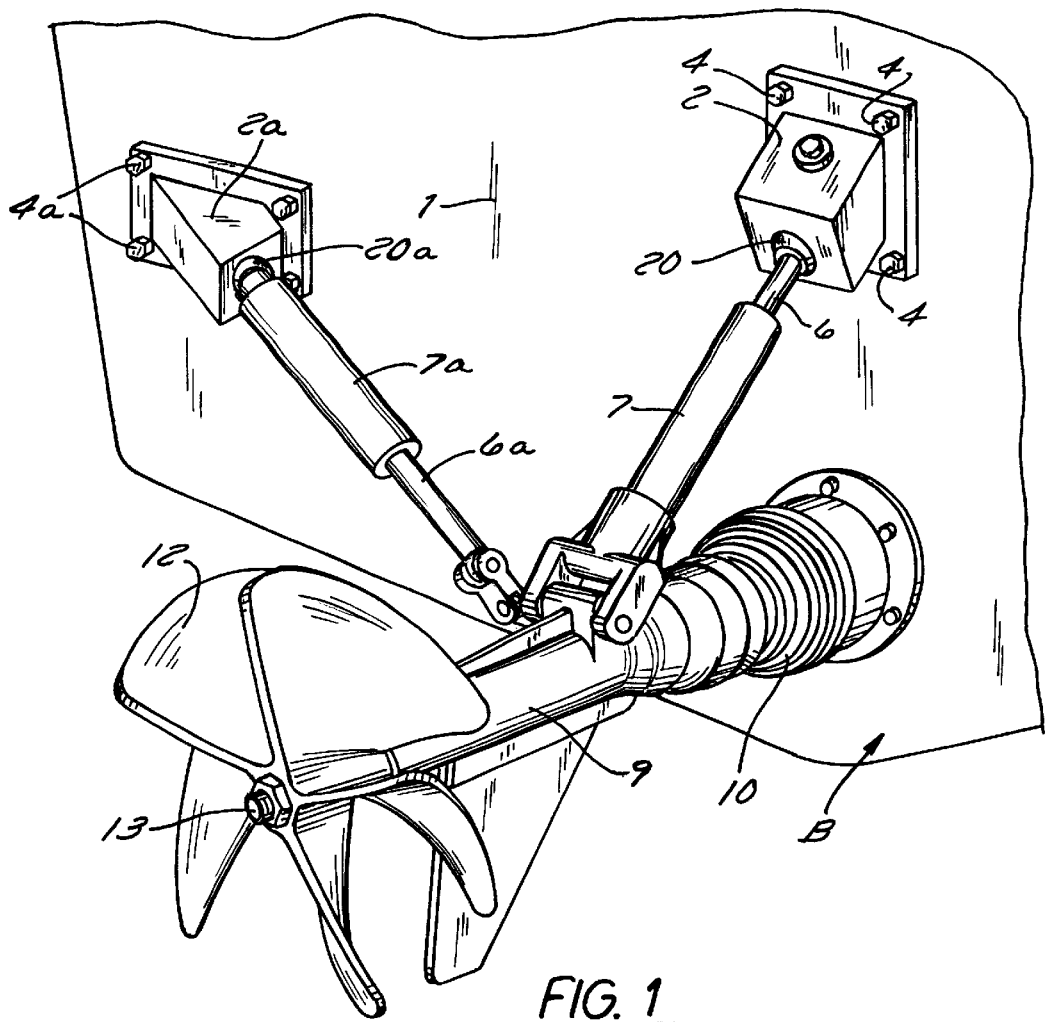
Figure 2:
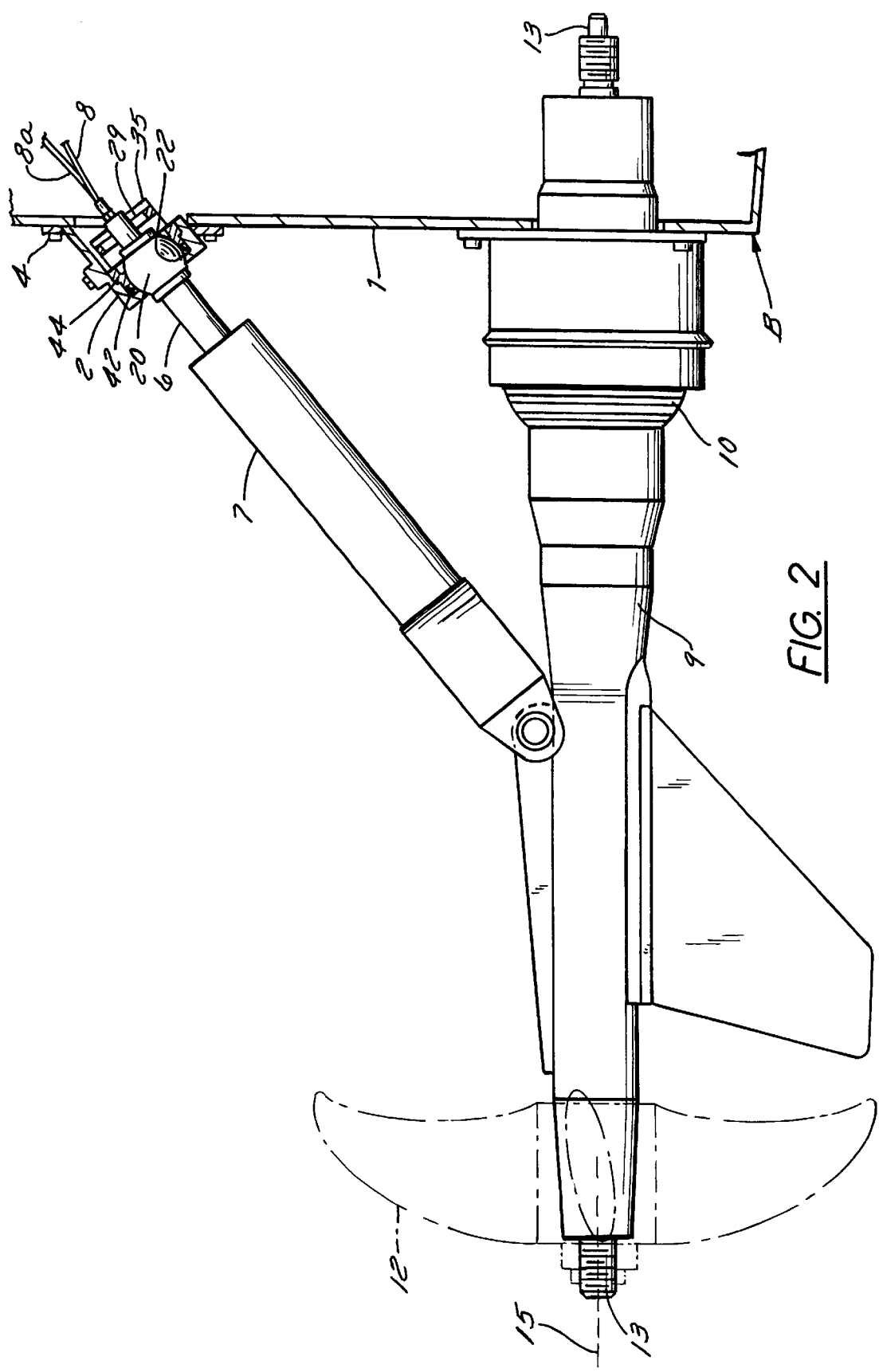
FIG. 2 is a vertical, fragmentary view partially in section and with parts broken away of a marine drive embodying the present invention as a trim cylinder.

The present invention finds particular use in a marine propeller drive apparatus of the type shown in U.S. Pat. No. 4,645,463, issued Feb. 24, 1987. As shown in FIGS. 1 and 2, the invention is attached to the transom 1 of a boat by means of a cast bracket 2, which is bolted to the transom by bolts 4. The piston rod 6 extending from the cylinder 7 is reciprocated in the cylinder under fluid pressure from fluid hoses 8 and 8a (FIGS. 1, 2 and 4), which lead to the interior of the cylinder, to vary the angle of the drive unit 9 relative to the boat B and about the spherical mounting 10 (FIG. 2) in the known manner. A propeller 12 is fixed to the rear end of the drive shaft 13, and the water surface is at the center of the propeller as shown in FIG. 2.

Figure 5:
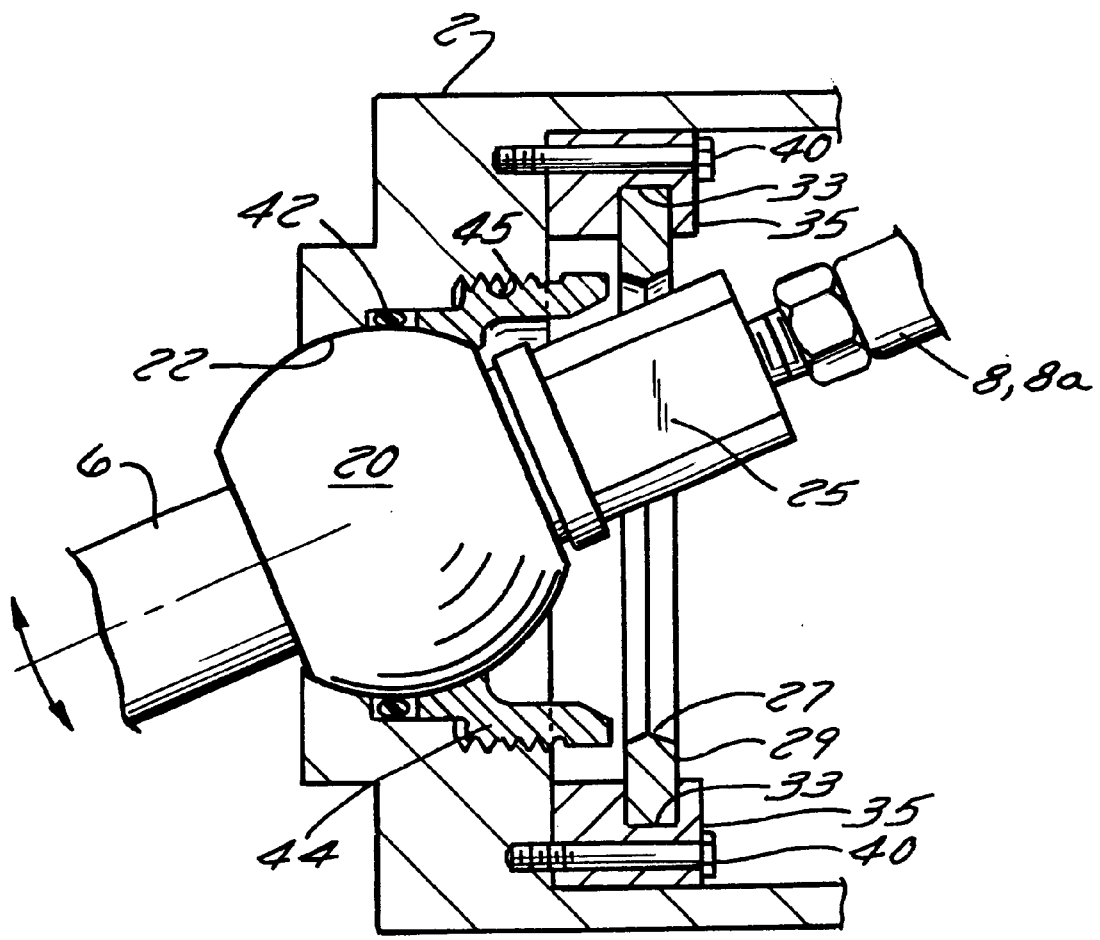
FIG. 5 is a view taken along the line 5—5 in FIG. 4.

As shown clearly in FIGS. 3 and 5, a spherical connection in the form of a ball 20 formed and near the outer end of the piston rod 6 is mounted in a complementary shaped spherical socket 22 which is formed in the bracket 2. The outermost free-end of the cylinder rod 6 is formed with a noncircular, flattened or flat portion 25 and is slidable in rectangular hole or slot 27 in the yoke 29. The yoke 29 is slidably and reciprocally mounted in the guide slots 33 located in guides 35 at each end of the yoke 29. The guides 35 are secured by bolt means 40 (FIGS. 4 and 5) to the bracket 2.

As mentioned, the piston rod 6 in FIGS. 1 and 2 is attached to the transom 1 of the boat by means of the cast bracket 2 which provides a ball and socket arrangement permitting the piston rod to swivel. Two fixed guides 35 are provided on two sides of the piston rod. A slot 33 formed by each guide 35 faces toward the piston rod and a sliding yoke 29 is placed within the guide slots and can move vertically within the slots. The piston rod flat end 25 extends through a rectangular slot 27 in the sliding yoke and the rod is allowed to move laterally within the yoke. Flattened portion or flats 25 on the piston rod end engage with the upper and lower faces of the rectangular slot 27 which is machined to have a small working clearance with the flat end of the rod. Thus the flat end 25 of the piston rod end permit it to slide laterally within the yoke 29 but prevent rotation of the rod along the longitudinal axis of the rod.

When the piston rod 6 swivels in the vertical plane about the ball 20, the rod will carry the yoke upwardly or downwardly. When the rod swivels in the horizontal plane, the yoke remains stationary while the rod moves laterally within it. In either case, the rod remains engaged (constrained not to rotate within) the yoke, and the yoke is engaged (constrained not to rotate within) with the guides. Therefore the rod can never rotate but can move freely in any other way, thus preventing the fluid hoses 8 and 8a (FIGS. 2 and 3) from twisting.

Figure 6:
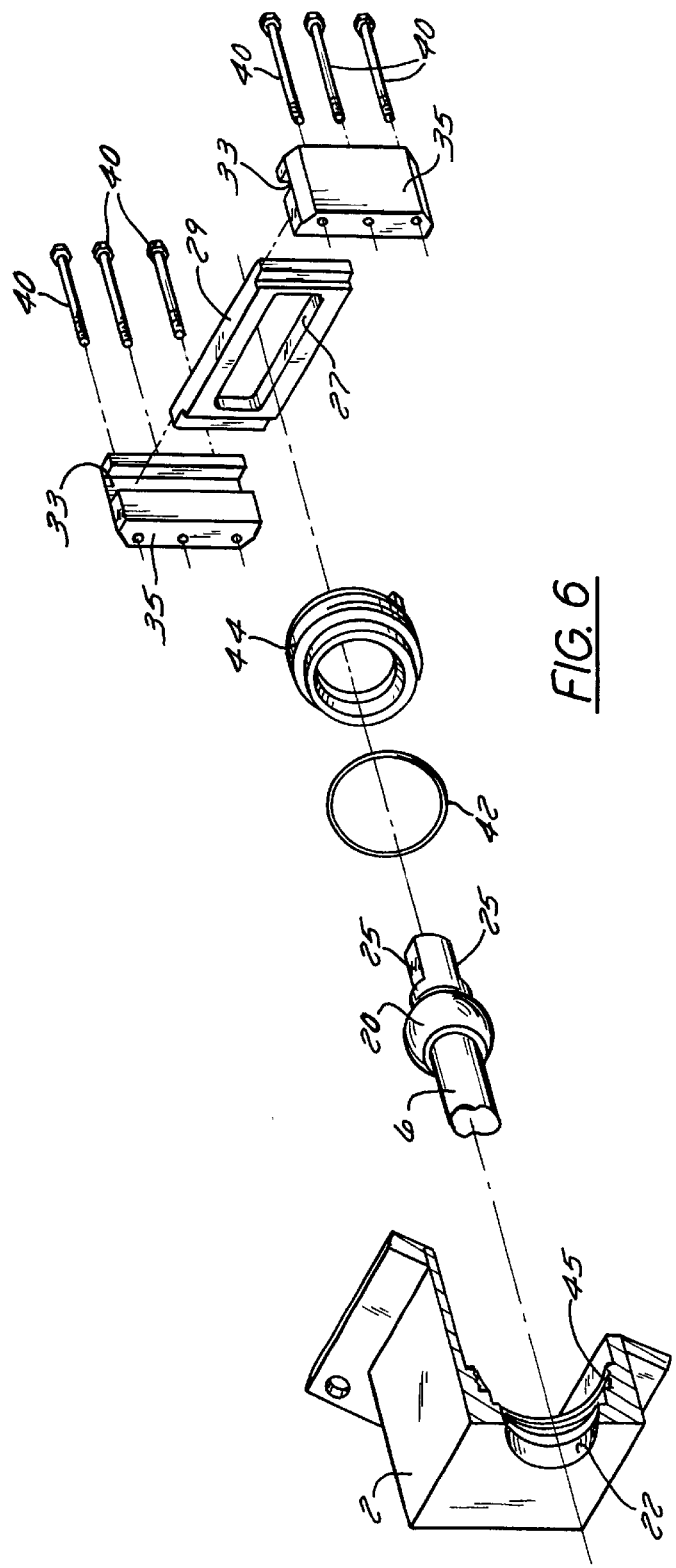
FIG. 6 is a schematic, perspective exploded view of the invention, certain parts being shown as broken away or removed for the sake of clarity.
Figure 7:
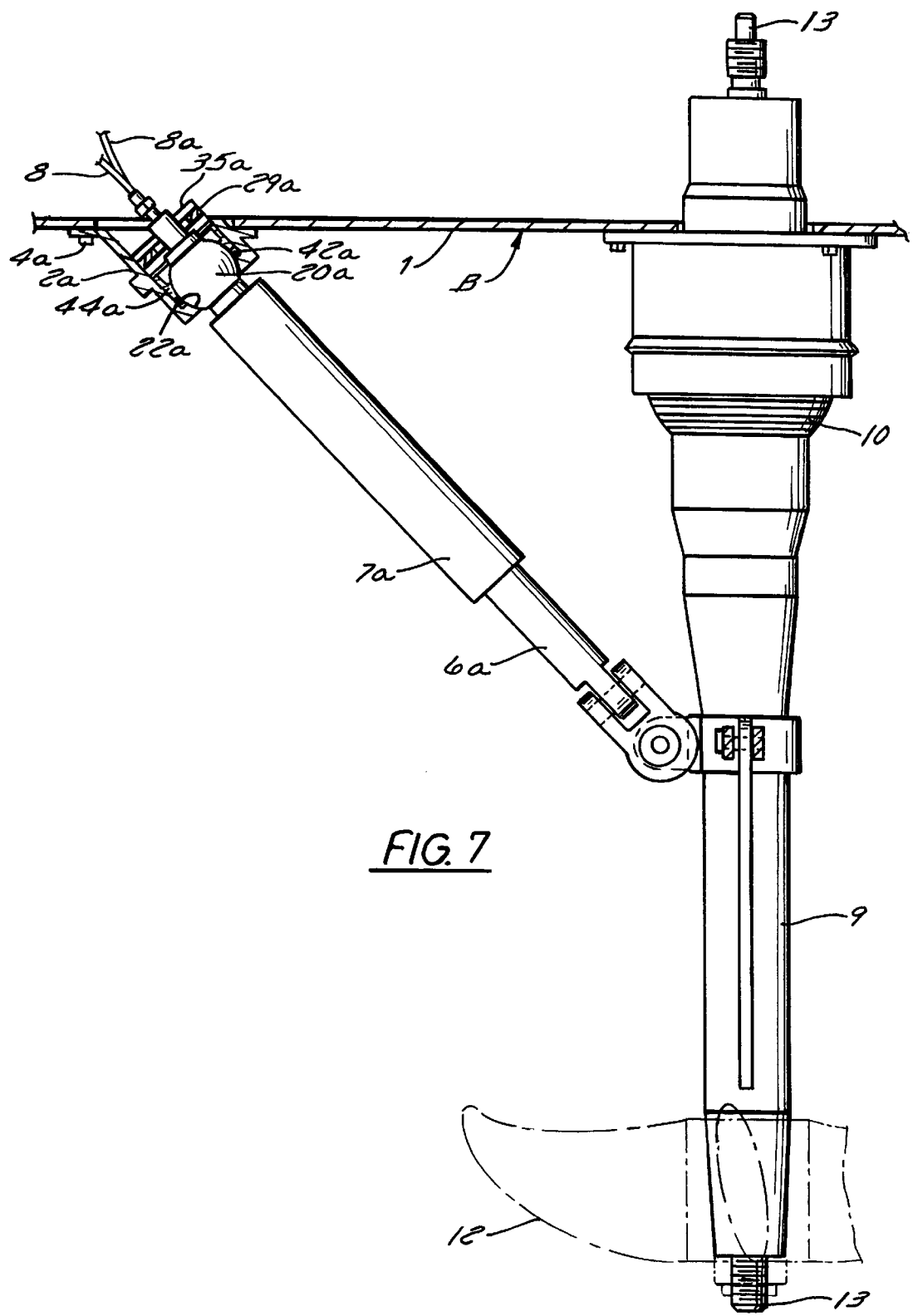
FIG. 7 is an enlarged view of the steering cylinder 7a shown in FIG. 1, wherein the cylinder is attached to the transom.

As shown as a steering assembly in FIG. 7, the cylinder and piston rod are reversed from the trim assembly shown in FIG. 2, and the ball end of the cylinder is attached to the transom of the boat by bracket 2a and its associated parts shown in FIG. 6 and similarly numbered with the suffix a, and previously explained. The operation of the bracket 2a and its associated swivel connection is the same as that shown and described in connection with the other figures. In this case, the cylinder is prevented from rotating around the piston rod, preventing twisting of the fluid hoses 8 and 8a.

The housing, guides, yoke and piston rod may together be mounted in any position. The entire assembly may be arranged vertically, horizontally or in any other position as long as the relationship between the above-mentioned parts is maintained.

The swivel connection is sealed from the water by the flexible sealing element or ring 42 which surrounds the ball 20 and by the bronze nut 44 which is threaded in the counterbore 45 formed in the bracket 2 and which embraces the ball 20 and compresses the sealing element 42 to form a watertight joint.

What is claimed is:

1. A marine surface drive for a propeller including a drive shaft assembly extending rearwardly from a transom of a boat and adjustable relative to said transom;
   a double-acting hydraulic cylinder and piston rod connected between said boat and said drive shaft assembly for adjusting said assembly, said piston rod extending from said cylinder and having a connection with said boat which prevents rotation of said piston within said cylinder, said connection comprising; a bracket secured to said boat and having a spherical socket, said piston rod end having a spherical ball portion near the end of said rod and swively mounted in said socket, said end of said rod having a flattened portion; a yoke having a slot in which said flattened portion is slidable in opposite directions, said bracket having guide slots arranged at right angles to said yoke slot, said yoke being slidable in said guide slots whereby said rod can swivel about said socket, and said rod end can slide in said opposite directions and also at right angles thereto.

2. A double-acting hydraulic cylinder and piston rod, said piston rod axially slidable in said cylinder and extending from said cylinder and having a flattened end, a bracket having a spherical socket, said piston rod end having a spherical ball portion swively mounted in said socket, a yoke having a slot in which said flattened end is slidably mounted for sliding in opposite directions, guides having guide slots arranged at right angles to said yoke slot, said yoke being slidable in said guide slots whereby said rod can swivel about said socket and said rod end can slide in said opposite directions in said yoke and said rod end can also move at right angles thereto by sliding with said yoke in said guide slots, whereby said piston rod can move in any direction but is prevented from rotating about its longitudinal axis within said cylinder.

3. A double-acting hydraulic cylinder and piston rod, a fluid hose connected with said rod for conducting fluid thereto, said piston rod axially slidable in said cylinder and extending from said cylinder and having a generally flat outer end, a bracket having a spherical socket, said piston rod end having a spherical ball portion swively mounted in said socket, a yoke having a slot in which said generally flat end is slidably mounted for sliding in opposite directions, said flat portion prevents said rod from rotating about its longitudinal axis, guides having guide slots arranged at right angles to said yoke slot, said yoke being slidable in said guide slots whereby said rod can swivel about said socket and said rod end can slide in said opposite directions in said yoke and said rod end can also move at right angles thereto by sliding with said yoke in said guide slots, whereby said piston rod can move in any direction but is prevented from rotating about its longitudinal axis within said cylinder and thereby preventing rotation of said rod about its longitudinal axis and consequent twisting of said hose.

4. In a marine surface drive for a propeller including a drive shaft assembly extending rearwardly from a transom of a boat and adjustable relative to said transom;
   a double-acting hydraulic cylinder and piston rod connected between said boat and said drive shaft assembly for adjusting said assembly relative to said transom, said piston rod extending from said cylinder and having an end for connection with said boat which prevents rotation of said piston within said cylinder, said connection comprising;
   a bracket secured to said boat and having a spherical socket, said piston rod end having a spherical ball portion near the end of said rod and swively mounted in said socket, said end of said rod having a noncircular cross section; a yoke having a slot in which said noncircular portion is slidably mounted for movement in opposite directions, said bracket having guide slots arranged at right angles to said yoke slot, said yoke being slidable in said guide slots whereby said rod can swivel about said socket and said rod end can slide in said opposite directions and also at right angles thereto, and preventing said rod from rotating about its longitudinal axis, a waterproof seal in said bracket spherical socket and bearing against said piston rod ball portion, said seal including a resilient ring and a threaded nut for compressing said ring between said ball portion and said socket.

5. A marine surface drive for a propeller including a drive shaft assembly extending rearwardly from a transom of a boat and adjustable relative to said transom;
   a double-acting hydraulic cylinder and piston rod connected between said boat and said drive shaft assembly for adjusting said assembly, said cylinder extending from said piston and having a connection with said boat which prevents rotation of said cylinder about said piston, said connection comprising; a bracket secured to said boat and having a spherical socket, said cylinder having a spherical ball portion near the end of said cylinder and swively mounted in said socket, said end of said cylinder having a flattened portion; a yoke having a slot in which said flattened portion is slidable in opposite directions, said bracket having guide slots arranged at right angles to said yoke slot, said yoke being slidable in said guide slots whereby said cylinder can swivel about said socket, and said cylinder end can slide in said opposite directions and also at right angles thereto.

6. A double-acting hydraulic cylinder and piston rod, said piston rod axially slidable in said cylinder and extending from said cylinder, said cylinder having a flattened end, a bracket having a spherical socket, said cylinder end having a spherical ball portion swively mounted in said socket, a yoke having a slot in which said flattened end is slidably mounted for sliding in opposite directions, guides having guide slots arranged at right angles to said yoke slot, said yoke being slidable in said guide slots whereby said cylinder can swivel about said socket and said cylinder end can slide in said opposite directions in said yoke and said cylinder end can also move at right angles thereto by sliding with said yoke in said guide slots, whereby said cylinder can move in any direction but is prevented from rotating about its longitudinal axis about said piston rod.

7. A double-acting hydraulic cylinder and piston rod, a fluid hose connected with said cylinder for conducting fluid thereto, said cylinder axially slidable relative to said cylinder and extending from said rod, said cylinder having a generally flat outer end, a bracket having a spherical socket, said cylinder having a spherical ball portion swively mounted in said socket, a yoke having a slot in which said generally flat end is slidably mounted for sliding in opposite directions, said flat portion prevents said cylinder from rotating about its longitudinal axis, guides having guide slots arranged at right angles to said yoke slot, said yoke being slidable in said guide slots whereby said cylinder can swivel about said socket and said cylinder can slide in said opposite directions in said yoke and said cylinder can also move at right angles thereto by sliding with said yoke in said guide slots, whereby said cylinder can move in any direction but is prevented from rotating about its longitudinal axis about said rod and thereby preventing rotation of said cylinder about its longitudinal axis and consequent twisting of said hose.

8. In a marine surface drive for a propeller including a drive shaft assembly extending rearwardly from a transom of a boat and adjustable relative to said transom;

a double-acting hydraulic cylinder and piston rod connected between said boat and said drive shaft assembly for adjusting said assembly relative to said transom, said cylinder extending from said rod and having an end for connection with said boat which prevents rotation of said cylinder about said rod, said connection comprising;

a bracket secured to said boat and having a spherical socket, said cylinder end having a spherical ball portion near the end of said cylinder and swively mounted in said socket, said end of said cylinder having a noncircular cross section; a yoke having a slot in which said noncircular section is slidably mounted for movement in opposite directions, said bracket having guide slots arranged at right angles to said yoke slot, said yoke being slidable in said guide slots whereby said cylinder can swivel about said socket and said cylinder end can slide in said opposite directions and also at right angles thereto, and preventing said cylinder from rotating about its longitudinal axis, a waterproof seal in said bracket spherical socket and bearing against said cylinder ball portion, said seal including a resilient ring and a threaded nut for compressing said ring between said ball portion and said socket.

9. A marine surface drive for a propeller including a drive shaft assembly extending rearwardly from a transom of a boat and adjustable relative to said transom;

a double-acting unit having an hydraulic cylinder and piston rod, said unit connected between said boat and said drive shaft assembly for adjusting said assembly, said unit having a connection with said boat which prevents relative rotation between said piston and said cylinder, said connection comprising;

a bracket secured to said boat and having a spherical socket, said unit having a spherical ball portion near one end thereof for swively mounting said unit in said socket, said one end of said unit having a flattened portion; a yoke having a slot in which said flattened portion is slidable in opposite directions, said bracket having guide slots arranged at right angles to said yoke slot, said yoke being slidable in said guide slots whereby said unit can swivel about said socket, and said one end can slide in said opposite directions and also at right angles thereto.

10. A double-acting hydraulic unit having a cylinder and piston rod, said piston rod axially slidable in said cylinder and extending from said cylinder, said unit having a flattened end, a bracket having a spherical socket, said unit having a spherical ball portion adjacent said one end and swively mounted in said socket, a yoke having a slot in which said flattened end is slidably mounted for sliding in opposite directions, guides having guide slots arranged at right angles to said yoke slot, said yoke being slidable in said guide slots whereby said unit can swivel about said socket and said flattened end can slide in said opposite directions in said yoke and said end can also move at right angles thereto by sliding with said yoke in said guide slots, whereby said unit can move in any direction but its rod and cylinder are prevented from rotating about its longitudinal axis relative to one another.

11. A double-acting hydraulic cylinder and piston rod unit, fluid hoses connected with said unit for conducting fluid thereto, said piston rod axially slidable in said cylinder and extending from said cylinder, said unit having a generally flat outer end, a bracket having a spherical socket, said unit having a spherical ball portion swively mounted in said socket, a yoke having a slot in which said generally flat end is slidably mounted for sliding in opposite directions, said flat end prevents relative rotation between said rod and said cylinder about their longitudinal axis, guides having guide slots arranged at right angles to said yoke slot, said yoke being slidable in said guide slots whereby said unit can swivel about said socket and said flat end can slide in said opposite directions in said yoke and said flat end can also move at right angles thereto by sliding with said yoke in said guide slots, whereby said unit can move in any direction but is prevented from rotating about its longitudinal axis, thereby preventing twisting of said hoses.

12. In a marine surface drive for a propeller including a drive shaft assembly extending rearwardly from a transom of a boat and adjustable relative to said transom;

a double-acting hydraulic cylinder and piston rod unit connected between said boat and said drive shaft assembly for adjusting said assembly relative to said transom, said unit having an end for connection with said boat which prevents rotation of said piston within said cylinder, said connection comprising;

a bracket secured to said boat and having a spherical socket, said unit having a spherical ball portion near an end thereof and swively mounted in said socket, said end of said unit having a noncircular cross section; a yoke having a slot in which said noncircular portion is slidably mounted for movement in opposite directions, said bracket having guide slots arranged at right angles to said yoke slot, said yoke being slidable in said guide slots whereby said unit can swivel about said socket and said unit end can slide in said opposite directions and also at right angles thereto, and preventing said unit from rotating about its longitudinal axis, a waterproof seal in said bracket spherical socket and bearing against said ball portion, said seal including a resilient ring and a threaded nut for compressing said ring between said ball portion and said socket.

\* \* \* \* \*